Aug. 14, 1934.  A. R. HARVEY  1,970,521
FREENESS TESTER
Filed April 25, 1931
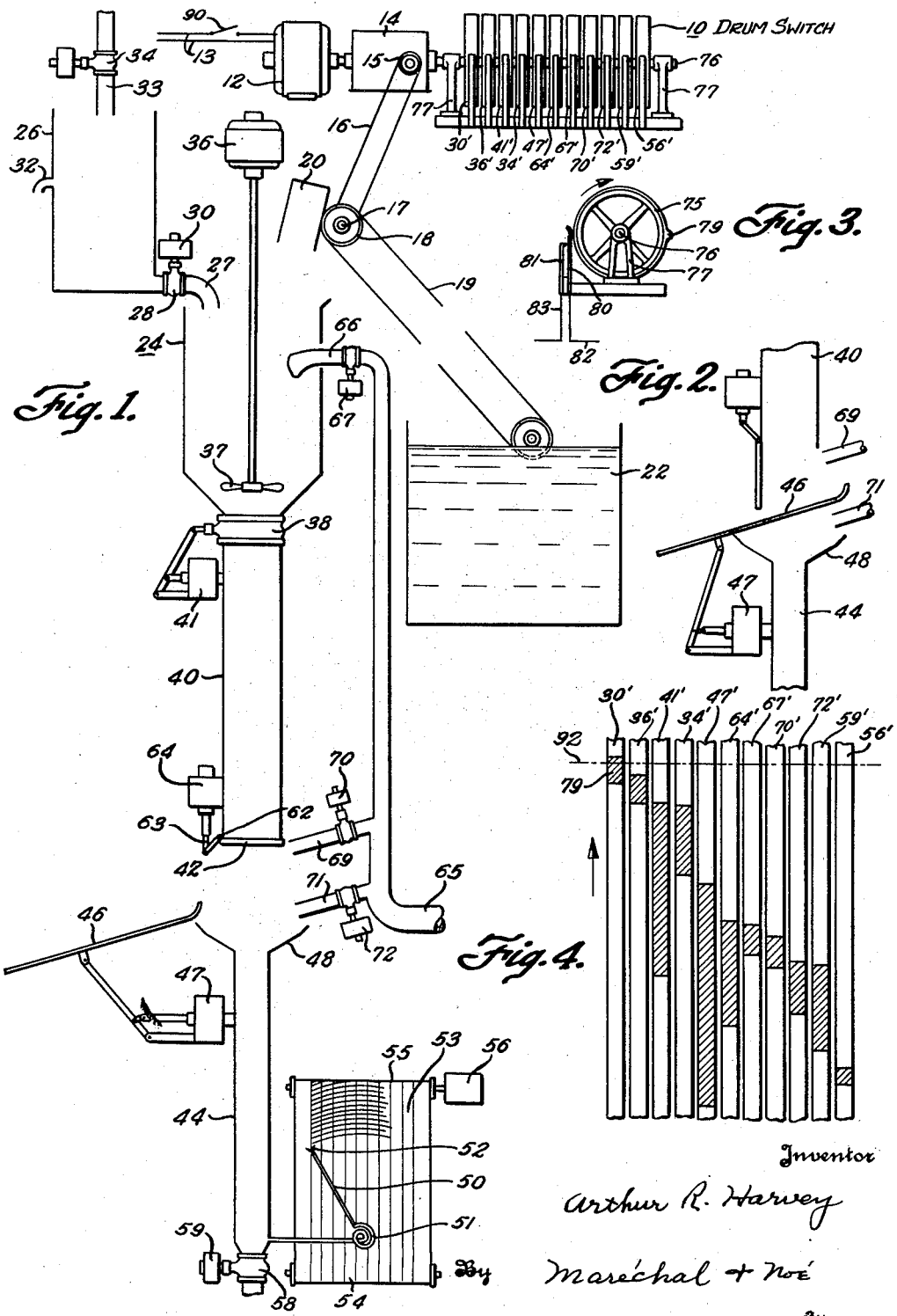
Inventor
Arthur R. Harvey
By Maréchal + Noé
Attorney Patented Aug. 14, 1934

1,970,521

UNITED STATES PATENT OFFICE 1,970,521

FREENESS TESTER

Arthur R. Harvey, Middletown, Ohio, assignor, by mesne assignments, to The Gardner-Richardson Company, Middletown, Ohio, a corporation of Ohio Application April 25, 1931, Serial No. 532,881

11 Claims. (Cl. 73—51)

This invention relates to the testing of the freeness characteristic of fibrous material used as paper making stock and like materials.

One of the principal objects of the invention is the provision of apparatus for determining the freeness of a fibrous material, such apparatus being of simple construction and adapted to operate automatically for quickly and accurately testing the freeness of a sample of paper forming stock, and for recording the result of that test.

Another object of the invention is the provision of such an apparatus in which the cycle of operation is carried out in a series of steps, the control being such that the parts of the apparatus are automatically operated in sequence and are returned after use to positions permitting repeat operation of the device, and a succession of tests without manual aid.

Other objects and advantages of the invention will be apparent from the following description, the appended claims and the accompanying drawing.

In the drawing, which illustrates a preferred embodiment of the invention—

Fig. 1 is a diagrammatic showing of testing apparatus constructed in accordance with this invention;

Fig. 2 is a fragmentary view showing some of the parts as they stand during a portion of the cycle of operation;

Fig. 3 is an end elevational view of a portion of the control apparatus; and

Fig. 4 is a diagrammatic showing of the control drums developed into a plane surface.

The drawing, in which like characters of reference designate like parts throughout the several views thereof, illustrates a mechanism for automatically testing a sample of fibrous material such as paper making stock for freeness and for graphically recording the result of the test. The testing operation is carried out in a sequence of related steps and the apparatus is so constructed that the cycle may be continuously repeated so that a frequent and accurate check may be obtained of the freeness characteristic of the material being tested. The device may be readily adapted for use wherever it is desirable to obtain the freeness characteristic of fibrous material. For example, very satisfactory control may be secured when used at the headbox of a paper making machine because of the short time interval elapsing between the test result of a withdrawn sample of stock and the use of the main body of stock on the wire.

The operation of the device in general terms is as follows: A sample of fibrous material of predetermined amount is withdrawn from a source of supply and is mixed with a predetermined quantity of water to provide a liquid suspension of fibrous material which is permitted to pass through a screen for a definite time interval, and the quantity of liquid obtained is an indication of the freeness of the stock at the time the sample was withdrawn.

Control means are provided so that the testing apparatus may operate automatically through the cycle of operation and be returned to an initial setting for repeat operations.

In the diagrammatic showing of the apparatus the several containers through which the test sample passes during the testing operation are placed with respect to one another so that the test material may pass through the apparatus by gravity flow. The movement and treatment of the test sample through the apparatus is governed by the operation of a common control 10 so that the operation of each part of the apparatus is synchronized and will occur in timed relation to the operation of the other parts. As shown, an electric motor 12, which is supplied with current through the wires 13 from a suitable source of power, drives a gear reduction 14 of suitable form which is positioned between the control 10 and the motor 12 so that the control will be driven by the motor 12 through one complete cycle of operating during a desired time interval; that time interval being dependent upon the motor speed and the reduction of the gears in the reducer 14. The reducer 14 is also provided with a power take off 15 having a chain drive 16 to a shaft 17 upon which is mounted the sprocket 18 of a conveyor 19. The conveyor carries a bucket 20 which traverses a path from a container or source of supply 22, of stock which is to be tested, to within dumping range of the mixing container 24 of the tester. The container 22 may, for example, be the headbox of a paper making machine having a supply of paper forming stock which is being fed through the machine and upon which it is desirable to keep a close check as to variation in freeness. It is to be understood that other suitable timed means may be provided for introducing samples of stock to the mixing container of the testing device.

The addition of water to the mixing container 24, by which the stock sample is reduced to a liquid suspension of fibrous material, is provided from a supply tank 26, which is positioned above the mixing container so that a discharge outlet 27 from the supply tank will drain into the container 24. A valve 28 is positioned in the outlet 27 and is provided with a control, such as the solenoid 30, which is connected electrically with the control 10 so that the circuit for the solenoid 30 will be energized at a proper time to permit the contents of the tank 26 to be emptied into the mixing container 24. The conveyor 19, being driven through the reduction box 14, is caused to operate in timed relation to the control 10 and is so assembled that the sample cup 20 is caused to discharge its contents into the mixing container 24 at the same time that the solenoid 30 is energized to permit discharge of the mixing water into the container 24. A predetermined quantity of water is permitted to pass from the tank 26 by provision of an overflow pipe 32 on the side of the tank 26 at a level which limits the tank contents to the desired quantity. If the capacity of the sample cup is between 100 to 150 cc., the tank 26 is preferably of about one quart capacity.

A refill pipe 33 is provided for the tank and is connected to a source of supply of water through a valve 34 having a solenoid control which is connected to the control 10 so that the tank 26 will be refilled at a proper time in the cycle of operation. When refilling the tank 26 the refill pipe 33 is opened by its solenoid control for a time sufficient to introduce a quantity of water to the tank in excess of that required so that the surplus may drain off through the overflow pipe 32 and a proper quantity of water will be retained in the tank without having to provide means for introducing a measured quantity to the tank.

Upon dumping the contents of the sample cup 20 and tank 26 into the mixing container 24 the motor 36 of an agitator 37 is started by energizing the motor from the control 10 so that the materials will be thoroughly mixed to provide a liquid suspension of the fibrous material. After an agitating period of 15 to 20 seconds, or of sufficient duration to thoroughly mix the materials, a valve 38 in the bottom of the container 24 is opened to permit the contents to drain into a receiving container 40. The valve 38 is shown as having a solenoid control 41, and this, like the other solenoid operated valves, is connected for operation by the control device 10.

The receiving container 40 is provided with a screened outlet, which is indicated diagrammatically at 42, so that the fluid content of the mixture may drain into a measuring container 44 positioned therebeneath. The fiber content of the mixture tends to form a filter mat on the surface of the screened outlet which restrains the flow of water therethrough. The characteristics of this mat vary in accordance with freeness characteristics of the fibrous material and consequently the quantity of water which passes in a predetermined time interval through the filter mat formed on the screened outlet will vary with the freeness characteristic of the stock. To terminate the drainage flow to the measuring container 44 after a predetermined interval of draining, a trough 46 is provided which is movable to a position between the receiving container 40 and measuring container 44 so that further flow from the receiving container is diverted away from the measuring container. As shown, the trough 46 is movable by means of a solenoid control 47 from the inoperative position of Fig. 1 to the position of Fig. 2 in which it serves to divert the flow of fluid from the receiving container. The solenoid control 47 is operated in timed relation to the other parts of the device by the control 10, and preferably is arranged to move to diverting position 30 seconds after the solenoid 41 has moved to open the valve 38, thus providing a drainage period of 30 seconds duration.

The measuring container 44 is shown as being of relatively narrow tubular section having a funnel shaped opening 48 at the top which serves to direct the drainage liquid from the container 40 into the container 44 where its quantity is measured as an indication of the freeness of the test sample. In order that succeeding tests will bear a definite relation to one another it is necessary that each test should cover a drainage interval similar to that of the other tests. This is accomplished by operating the valve control 41 and the deflector control 47 in timed relation to one another so that upon each operation of the device a similar time interval will occur between the opening of the valve 38 and the introduction of the trough 46.

Any suitable means may be used for recording the level of drainage liquid in the measuring container 44. As shown, a recording arm 50 is provided on an expanding tube 51 connected to the bottom of the container 44. The outward end of the arm 50 is provided with a pen 52 which is adapted to trace the movement of the arm 50 upon a web of paper 53 which is fed from a supply roll 54 and is wound upon a roll 55 by movement of a motor drive 56 which is connected to the roll. The paper 53 has spaced guide lines whereby relative movements of the arm 50 on succeeding tests may be readily compared in determining changes in freeness. As the level in the container 44 rises during drainage thereinto, pressure created on the member 51 causes the arm to move so that the pen traces a path across the paper; the extent of the movement being dependent upon the water level in the container.

The motor 56 may be an electric motor drive which is energized from the control 10 in timed relation to the other parts of the apparatus, or it may comprise a driving means such as a clockwork motor which is regulated to feed the paper past the pen at a rate coordinated with a spacing of time intervals printed on the paper.

When the drainage period has been terminated by introduction of the trough 46, and after sufficient time has elapsed to permit the arm 50 to record the quantity in the container 44, a dump valve 58 in the bottom of the measuring container 44 is opened by a solenoid control 59 to permit the contents to be discharged. Upon discharge of the contents of container 44 the indicating arm returns to zero position. The motor 56 may then be energized from the control 10 for a time to advance the paper winding roll 55 an amount sufficient to advance the test record so that the next recording will be traced on the paper a suitable distance below the preceding record.

Suitable means are provided to thoroughly cleanse the testing apparatus prior to a repeat operation. As shown, the screened outlet 42 is hinged at 62 and is provided with an actuating arm 63 which connects to a solenoid control 64 so that upon energizing the control 64 the screened bottom of the container is caused to open (as shown in Fig. 2) so that the remaining contents of the container 40 may be dumped onto the trough 46 and then be carried away to waste. A supply pipe 65 is provided for conveying flushing water to the several parts of the system. As shown, this flushing pipe terminates in a valved outlet 66 which extends into the mixing container 24 and is provided with a solenoid control 67 so that at the proper time in a cycle of operation the solenoid may be energized by the control 10 to introduce flushing liquid to the mixing container to thoroughly remove all traces of any material which may have remained from the last previous test. Another valved outlet 69 is directed to play a jet of rinsing water against the open screen 42 and this also is provided with a solenoid control as indicated at 70. A third valved outlet 71 is provided with a solenoid control 72 so that when energized a stream of flushing water will clean the measuring container.

As mentioned, the various solenoid controls and motors of the device all operate in timed sequence with respect to one another. After a test the device is flushed and the various controls are all returned to the proper position to permit a repeat operation of the device. As illustrated, the control 10 comprises a series of drums 75 which are mounted side by side on a shaft 76 suitably supported in brackets 77 and in driving connection with the reduction gear 14. A drum 75 is provided for each actuating part of the device, and each drum is arranged to actuate the controlled part in proper timed relation to the parts of the other drums. As shown, each drum is provided with a cam surface 79 which, upon rotation of the drum, is adapted to engage a contact finger 80 and move that contact finger into engagement with a second finger 81 to thereby complete an electric circuit extending from a source of current supply to each of the parts of the tester. As the wiring connections are of conventional form they have not been illustrated in the diagram. As an example of how the connections would be made, a wire 82 extending from a source of current supply to the contact 80 and a second wire 83 connecting the contact 81 to the motor 56 would, upon movement of the drum 75 to bring the cam 79 into position to close the contacts 80 and 81, complete a supply circuit to one of the control devices; a common return circuit being provided for the various parts of the device.

In the developed showing of Fig. 4 an arrangement of control is illustrated whereby the sequence of movement of the parts of the device may be carried out in proper order. The cam extent of each drum 75 is indicated by a shaded area, and the line of contacts is indicated by the dot and dash line 92. Assuming that the apparatus is in position to start a testing cycle and the sample cup 20 is discharging its contents into the mixing container 24, the valve 28 is opened by energizing its solenoid 30 and this is shown in Fig. 4 by provision of a cam area 79 on the contacting drum 30' for that solenoid as being within the range of the line of contacts as indicated by the line 92. As the drums move and after filling the container 24, the motor 36 is caused to operate to agitate the mixture. Control for this motor is provided by a drum 36' having a cam area so placed relatively to the cam area of the drum 30' as to cause the motor 36 to operate in proper timed relation after the emptying of the tank 26. The solenoid control 41 for the valve 38 is connected with a drum 41' having a cam area positioned to permit the valve 38 to open after the contents of the mixing container have been agitated sufficiently. At some time after closure of the valve 28 the valve 34 is permitted to open for refilling the tank 26 by provision of a control drum 34' which energizes the solenoid of that valve. Subsequent operations are carried out in timed relation as mentioned and, as illustrated in the diagram, the solenoid 47 which terminates the drainage period into the measuring container 44 will be actuated by the cam area of the drum 47' after an elapsed time interval definitely related to the opening of the valve 38. The cam areas of the drum 64' for energizing the solenoid 64 of the screened outlet, and the drums 67', 70' and 72' for controlling the flow of flushing water to the outlets 67, 70 and 71 will all operate at the proper moment in the cycle. The contents of the measuring container are dumped upon energizing the solenoid 59 and this occurs at a time in the cycle of operation as shown by the position of the cam area on the drum 59'. The motor 56 of the recording device is energized by closure of the contacts associated with the cam area of the drum 56'. The extents of the cam areas are so proportioned that the various parts of the device are returned to their initial position at the termination of the contact period of each cam and in proper order so that upon completing the cycle of operation the device is again ready for the next succeeding testing operation. The cup 20, by being operated in timed relation to the control 10, is caused to discharge its contents into the container 24 at the same time the discharge valve 28 opens and, as the operation continues the various solenoids and motors are energized and deenergized as their cams enter and leave the line of contact of the control 10.

As shown, the driving motor 12 for the control apparatus is provided with lead wires 13 in which is incorporated a switch 90. If the tester is to be used only intermittently, the switch 90 can be left normally open, and can be manually closed each time the apparatus is to operate through a complete testing cycle. If it is desired to have the operation continue automaticaly the switch 90 may be left closed and, as the cams 79 have been spaced with respect to one another to permit the steps of the testing operation to proceed in proper order, the device will continue in operation without manual aid.

While the form of apparatus herein described constitutes a preferred embodiment of the invention, it is to be understood that the invention is not limited to this precise form of apparatus, and that changes may be made in either without departing from the scope of the invention which is defined in the appended claims.

What is claimed is:

1. In apparatus of the character described, a receiving container having means for forming a filter mat therein, a measuring container positioned to receive a drainage flow from the receiving container, means for introducing a liquid suspension of fibrous material of predetermined quantity to said receiving container, and means operated in timed relation to the means introducing the suspension to terminate the drainage flow to the measuring container.

2. In apparatus of the character described, a receiving container having a screened outlet, means for introducing a liquid suspension of fibrous material of predetermined quantity to said container, a measuring container positioned to receive the drainage flow from the screened outlet of the receiving container, means for terminating the flow to the measuring container at a predetermined time after introduction of the material to the receiving container, means for measuring the quantity of drainage flow to the measuring container, and control means for actuating said several means.

3. In apparatus of the character described, a receiving container having a screened outlet, means for introducing a liquid suspension of fibrous material of predetermined quantity to said container, a measuring container positioned to receive the drainage flow from the screened outlet of the receiving container, means for terminating the flow to the measuring container, means for measuring the quantity of drainage flow to the measuring container, and control means for actuating said several means in timed sequence.

4. In apparatus of the character described, a receiving container having a screened outlet, means for introducing a liquid suspension of fibrous material of predetermined quantity to said container, a measuring container positioned to receive the drainage flow from the screened outlet of the receiving container, means for terminating the flow to the measuring container at a predetermined time after introduction of the material to the receiving container, means for measuring the quantity of drainage flow to the measuring container, and control means for actuating said several means to direct the flow of test material through the apparatus and to return said means to an initial position for a repeat operation.

5. In apparatus of the character described, a receiving container having a screened outlet, means for introducing a liquid suspension of fibrous material of predetermined quantity to said container, a measuring container positioned to receive the drainage flow from the screened outlet of the receiving container, means for terminating the flow to the measuring container at a predetermined time after introduction of the material to the receiving container, means for measuring the quantity of drainage flow to the measuring container, control means for actuating said several means to direct the flow of test material through the apparatus and to return said means to an initial position for a repeat operation, and means for initiating the operation of the control means.

6. In apparatus of the character described, a receiving container having a screened outlet, means for introducing a liquid suspension of fibrous material of predetermined quantity to said container, a measuring container positioned to receive the drainage flow from the screened outlet of the receiving container, means for terminating the flow to the measuring container, means for measuring the quantity of drainage flow to the measuring container, and control means for continuously actuating said several means in timed sequence for repeat operation of the cycle.

7. In apparatus of the character described, a receiving container having a screened outlet, means for introducing a liquid suspension of fibrous material of predetermined quantity to said container, a measuring container positioned to receive the drainage flow from the screened outlet of the receiving container, means for terminating the flow to the measuring container at a predetermined time after introduction of the material to the receiving container, means for measuring the quantity of drainage flow to the measuring container, means for releasing the contents of the measuring container, means for releasing the residue from the receiving container, means for introducing a flow of flushing fluid to the apparatus, and control means for automatically actuating said several means.

8. In apparatus of the character described for measuring the drainage flow of a liquid suspension of fibrous material; a mixing container positioned to discharge the contents thereof into a receiving container, valve means for regulating the flow from the mixing container, means for introducing a predetermined quantity of fibrous material to said mixing container, a liquid storage tank having an overflow outlet positioned to waste liquid in excess of a predetermined quantity, a discharge outlet from the storage tank to the mixing container, means for controlling the flow through said discharge outlet, valve means for controlling the supply of liquid to the storage tank, and control means for actuating said several means in sequence and for maintaining the supply valve open for a time sufficient to supply an excess of liquid to the supply tank.

9. In apparatus of the character described for measuring the drainage flow of a liquid suspension of fibrous material; a receiving container, a mixing container positioned to discharge the contents thereof into said receiving container, valve means for regulating the flow from the mixing container, means for introducing a predetermined quantity of fibrous material to said mixing container, a liquid storage tank, a discharge outlet from the storage tank to the mixing container, means for controlling the flow through said discharge outlet, an agitator positioned to act upon the contents of the mixing container, drive means for the agitator, and control means for actuating said several means in sequence to provide a liquid suspension of fibrous material in the mixing container and for opening the valve means from the mixing container.

10. In apparatus of the character described for measuring the drainage flow of a liquid suspension of fibrous material; a mixing container adapted to receive a liquid suspension of fibrous material of measured quantity, a receiving container having a screened outlet, and a measuring container positioned in gravity flow relationship in the succession named, valve means operable between the mixing and receiving containers, means for diverting the flow from the receiving container away from the measuring container, and control means for said several means operable to provide a time interval of predetermined extent between the opening of the valve means and operation of the diverting means.

11. In apparatus of the character described for measuring the drainage flow of a liquid suspension of fibrous material; a mixing container, a receiving container having a screened outlet, and a measuring container positioned in gravity flow relationship in the succession named, means for introducing a predetermined quantity of such material to the mixing container, valve means operable between the mixing and receiving containers, means movable between the receiving and measuring containers for diverting the flow from the receiving container away from the measuring container, control means for said several means operable to provide a time interval of predetermined extent between the opening of the valve means and introduction of the diverting means, and means for measuring the drainage flow into the measuring container.

ARTHUR R. HARVEY.